(12) United States Patent  
Manabe et al.

(10) Patent No.: US 12,110,200 B2  
(45) Date of Patent: Oct. 8, 2024

(54) BIAXIALLY ORIENTED POLYESTER FILM ROLL

(71) Applicant: TOYOBO CO., LTD., Osaka (JP)

(72) Inventors: Nobuyuki Manabe, Inuyama (JP); Masayuki Haruta, Inuyama (JP)

(73) Assignee: TOYOBO CO., LTD., Osaka (JP)

(*) Notice: Subject to any disclaimer, the term of this patent is extended or adjusted under 35 U.S.C. 154(b) by 473 days.

(21) Appl. No.: 17/285,777

(22) PCT Filed: Oct. 25, 2019

(86) PCT No.: PCT/JP2019/041984  
§ 371 (c)(1),  
(2) Date: Apr. 15, 2021

(87) PCT Pub. No.: WO2020/090673  
PCT Pub. Date: May 7, 2020

(65) Prior Publication Data  
US 2021/0339973 A1  Nov. 4, 2021

(30) Foreign Application Priority Data  
Oct. 30, 2018 (JP) ................. 2018-203615

(51) Int. Cl.  
*B65H 18/28* (2006.01)  
*B29C 48/00* (2019.01)  
(Continued)

(52) U.S. Cl.  
CPC ............. *B65H 18/28* (2013.01); *C08J 5/18* (2013.01); *B29C 48/0018* (2019.02);  
(Continued)

(58) Field of Classification Search  
None  
See application file for complete search history.

(56) References Cited

U.S. PATENT DOCUMENTS 5,595,819 A * 1/1997 Anderson ............... C08K 3/26  
428/480  
11,524,858 B2 * 12/2022 Haruta ................... B29C 61/06  
(Continued)

FOREIGN PATENT DOCUMENTS

JP  S62-222954 A  9/1987  
JP  S63-252853 A  10/1988  
(Continued)

OTHER PUBLICATIONS

Euroepan Patent Office, Extended European Search Report in European Patent Application No. 19878445.6 (dated Jul. 5, 2022).  
(Continued)

*Primary Examiner* — Vivian Chen  
(74) *Attorney, Agent, or Firm* — Leydig, Voit & Mayer, Ltd.

(57) ABSTRACT

Provided is a polyester film roll which has less wrinkles and film surface defects, exhibits no deviation of winding, and is suitable for secondary processing such as coating and vapor deposition. The polyester film roll is obtained by winding a biaxially oriented polyester film around a core, and is characterized by satisfying requirements (1)-(3) below: (1) the average winding hardness of the surface of the polyester film roll is in the range of 500-700; (2) the variation rate of the winding hardness of the surface of the polyester film roll in the film width direction is 1-5%; and (3) the variation rate of the average winding hardness from the surface of the polyester film roll to the core is 3-10%.

9 Claims, 2 Drawing Sheets

(51) Int. Cl.
  *B29C 48/08* (2019.01)
  *B29C 48/28* (2019.01)
  *B29K 67/00* (2006.01)
  *C08J 5/18* (2006.01)
  *C08K 3/36* (2006.01)

(52) U.S. Cl.
  CPC .............. *B29C 48/08* (2019.02); *B29C 48/28* (2019.02); *B29K 2067/003* (2013.01); *B65H 2701/1752* (2013.01); *C08J 2367/02* (2013.01); *C08K 3/36* (2013.01)

(56) References Cited

U.S. PATENT DOCUMENTS

| | | | |
|---|---|---|---|
| 11,565,459 B2* | 1/2023 | Haruta | C08J 5/18 |
| 2003/0089808 A1* | 5/2003 | Takeuchi | B65H 18/26 |
| | | | 242/160.4 |
| 2004/0180229 A1* | 9/2004 | Hayakawa | C08J 5/18 |
| | | | 428/480 |
| 2011/0014452 A1* | 1/2011 | Uto | B29C 48/345 |
| | | | 425/133.5 |
| 2022/0056223 A1* | 2/2022 | Haruta | B29C 48/08 |
| 2022/0126495 A1* | 4/2022 | Haruta | C08G 63/84 |
| 2022/0267541 A1* | 8/2022 | Inoue | B29C 55/06 |
| 2023/0365804 A1* | 11/2023 | Manabe | B29C 48/395 |
| 2024/0101770 A1* | 3/2024 | Manabe | B29C 48/287 |
| 2024/0124705 A1* | 4/2024 | Manabe | B29C 48/0021 |

FOREIGN PATENT DOCUMENTS

| | | | |
|---|---|---|---|
| JP | H08-092727 A | | 4/1996 |
| JP | H10-119172 A | | 5/1998 |
| JP | H11-010725 A | | 1/1999 |
| JP | H11-059986 A | | 3/1999 |
| JP | 2000-016644 A | * | 1/2000 |
| JP | 2000-103023 A | | 4/2000 |
| JP | 2006-299078 A | | 11/2006 |
| JP | 2006-318624 A | * | 11/2006 |
| JP | 2008-138103 A | | 6/2008 |
| JP | 2012-021164 A | | 2/2012 |
| JP | 2012-046736 A | | 3/2012 |
| JP | 2012-171329 A | | 9/2012 |
| JP | 2013-086263 A | | 5/2013 |
| JP | 2013-144725 A | | 7/2013 |
| JP | 2015-003408 A | | 1/2015 |
| JP | 2016-038534 A | | 3/2016 |
| JP | 5872595 B2 | | 3/2016 |
| JP | 2017-128080 A | | 7/2017 |
| JP | 2018-123318 A | | 8/2018 |
| WO | WO 01/48061 A | * | 7/2001 |

OTHER PUBLICATIONS

Japanese Patent Office, International Search Report in International Patent Application No. PCT/JP2019/041984 (dated Dec. 24, 2019).
European Patent Office, Communication Pursuant to Article 94(3) EPC in European Patent Application No. 19878445.6 (dated May 3, 2023).
Japanese Patent Office, Written Opinion of the International Searching Authority in International Patent Application No. PCT/JP2019/041984 (dated Dec. 24, 2019).
Processing Technology Research Institute, Slitter Rewinder Technology Textbook, pp. 5-11 and 60-89 (Apr. 11, 1998).
Korean Intellctual Property Office, Submission of Information in Korean Patent Application No. 10-2021-7004179 (dated Oct. 31, 2022).
Indonesia Directorate General of Intellectual Property, Substantive Examination Report in Indonesian Patent Application No. P00202100072 (dated Aug. 27, 2022).
Intellectual Property India, Examination Report in Indian Patent Application No. 202147022515 (dated Sep. 21, 2022).
Ji et al., "Electrostatic Charging and Discharging at a Film Winding Roll," *IEE Japan*, 113-A(6): 467-472 (1993).
Japan Patent Office, Submission of Information in Japanese Patent Application No. 2020-553854 (Aug. 10, 2022).
Japan Patent Office, Office Action in Japanese Patent Application No. 2020-553854 (Apr. 30, 2024).
Taiwan Intellectual Property Office, Office Action in Taiwanese Patent Application No. 108138558 (Jul. 31, 2024).

* cited by examiner

BIAXIALLY ORIENTED POLYESTER FILM ROLL

CROSS-REFERENCE TO RELATED APPLICATIONS

This patent application is the U.S. national phase of International Patent Application No. PCT/JP2019/041984, filed Oct. 25, 2019, which claims the benefit of Japanese Patent Application No. 2018-203615, filed Oct. 30, 2018, which are incorporated by reference in their entireties herein.

TECHNICAL FIELD

The present invention relates to a film roll obtained by winding a biaxially oriented polyester film and one that has less wrinkles and film surface defects, exhibits no deviation of winding, and is suitable for secondary processing such as coating and vapor-deposition. Furthermore, the present invention relates to a polyester film roll having excellent quality of a coating film after secondary processing.

BACKGROUND ART

Conventionally, polyester films have been widely utilized in a wide range of fields such as packaging materials and industrial materials because of their excellent mechanical strength, thermal properties, optical properties, and the like. In particular, biaxially oriented polyester films have excellent oxygen barrier properties, but there have been increasing demands for oxygen barrier properties and water vapor barrier properties related to denaturation and degradation of the contents and there is a problem that the contents are denatured and degraded in packaging applications for foods, retort products, pharmaceuticals and the like.

Hence, measures are taken for biaxially oriented polyester films used in packaging applications for foods, retort products, pharmaceuticals and the like to further improve the gas barrier properties such as oxygen barrier properties and water vapor barrier properties. As a method to improve gas barrier properties, a method in which a film having favorable gas barrier properties such as polyvinylidene chloride or polyethylene vinyl alcohol copolymer is pasted to a biaxially oriented polyester film and a method in which a thin film is formed on a biaxially oriented polyester film by vapor-deposition of a metal such as aluminum or a metal oxide such as aluminum oxide are often utilized.

In particular, the latter, a vapor-deposited polyester film in which a metal or metal oxide is provided on the film surface, is excellent in terms of heat resistance and transparency.

It is known that the performance of gas barrier properties of the obtained vapor-deposited polyester film greatly depends on the surface condition of the biaxially oriented polyester film used as the base material. A biaxially oriented polyester film as a base material, of which the surface roughness and the number of protrusions are prescribed (see, for example, Patent Document 1), a biaxially oriented polyester film of which the melting subpeak is prescribed (see, for example, Patent Document 2), a film in which the amount of oligomers generated in the film is prescribed (see, for example, Patent Document 3), and the like have been proposed.

However, even biaxially oriented polyester films having the same properties, there have been cases in which the quality of the coating film after processes such as coating and vapor-deposition varies and the quality is out of the permissible range sometimes. The causes thereof have also been unknown.

The factor that decreases the quality of the coating film includes wrinkles of the film of the polyester film roll before being unwound from the polyester film roll purchased as a product as well. As a method for ameliorating such a problem, a polyester film roll having decreased core wrinkles and surface wrinkles has been proposed (Patent Document 4).

PRIOR ART DOCUMENT

Patent Documents

Patent Document 1: JP-A-10-119172
Patent Document 2: JP-A-11-010725
Patent Document 3: JP-A-2006-299078
Patent Document 4: JP-A-63-252853

SUMMARY OF THE INVENTION

Problems to be Solved by the Invention

An object of the present invention is to improve such a problem and to provide a polyester film roll which has less wrinkles and film surface defects, exhibits no deviation of winding, and is suitable for secondary processing such as coating and vapor-deposition.

A further object of the present invention is to provide a polyester film roll having excellent quality of a coating film after secondary processing.

Means for Solving the Problems

As a result of diligent studies by the present inventors to achieve the objects, it is possible to provide a polyester film roll which has less wrinkles and film surface defects, exhibits no deviation of winding, and is suitable for secondary processing such as coating and vapor-deposition by keeping the variation in winding hardness from the core to the surface of the polyester film roll obtained by winding a biaxially oriented polyester film around a core and setting the winding hardness on the surface of the film roll to a specific range.

More suitably, a polyester film roll is obtained in which winding wrinkles, winding deviation, and spoking wrinkles on the roll end face are hardly generated and quality defects due to charging such as static marks and discharge marks are decreased.

Hence, it is possible to decrease the deterioration in quality due to partial unevenness and omission of the coating and vapor-deposited thin film even after secondary processing and troubles such as poor appearance due to wrinkles after winding after secondary processing.

In other words, the present invention has the following configurations.

1. A polyester film roll obtained by winding a biaxially oriented polyester film around a core, the polyester film roll satisfying following requirements (1) to (3):

(1) an average winding hardness on a surface of the polyester film roll is in a range of 500 or more and 700 or less;
    (2) a variation rate of a winding hardness on a surface of the polyester film roll in a film transverse direction is 1% or more and 5% or less; and (3) a variation rate of an average winding hardness from a surface of the polyester film roll to the core is 3% or more and 10% or less.

2. The polyester film roll according to 1., in which a thickness unevenness rate of the polyester film in a transverse direction is 10% or less.

3. The polyester film roll according to 1. or 2., in which dynamic friction coefficients on a winding outer surface and a winding inner surface of the biaxially oriented polyester film are both 0.2 or more and 0.60 or less.

4. The polyester film roll according to 1. to 3., in which an arithmetic mean height on a winding inner surface of the biaxially oriented polyester film is 0.010 μm or more and 0.050 μm or less.

5. The polyester film roll according to any one of 1. to 4., in which a thickness of the biaxially oriented polyester film is 5 μm or more and 40 μm or less.

6. The polyester film roll according to any one of 1. to 5., in which a winding length of the biaxially oriented polyester film is 2000 m or more and 65000 m or less.

7. The polyester film roll according to any one of 1. to 6., in which a width of the polyester film roll is 400 mm or more and 3000 mm or less.

8. The polyester film roll according to any one of 1. to 7., in which the biaxially oriented polyester film is for a vapor-deposited film base material.

Effect of the Invention

The polyester film roll of the present invention has less wrinkles and film surface defects, exhibits no deviation of winding, and is suitable for secondary processing such as coating and vapor-deposition.

More suitably, a polyester film roll is obtained in which winding wrinkles, winding deviation, and spoking wrinkles are hardly generated and quality defects due to charging such as static marks and discharge marks are decreased.

Hence, it is possible to decrease the deterioration in quality due to partial unevenness and omission of the coating and vapor-deposited thin film even after secondary processing and troubles such as poor appearance due to wrinkles after winding after secondary processing.

More suitably, it is possible to obtain a polyester film roll in which winding wrinkles and winding deviation at the time of winding and spoking wrinkles on the roll end face are not generated and quality defects due to charging such as static marks and discharge marks are decreased. In this case, it is possible to decrease troubles such as poor appearance due to vapor-deposition unevenness at the time of vapor-deposition processing and wrinkles at the time of winding after vapor-deposition and generation of defective products in post-processing including unevenness and omission due to partial repellence of the vapor deposited thin film.

In particular, in recent years, polyester film rolls have been widened and lengthened in order to increase the processing efficiency of biaxially oriented polyester films, and it is possible to improve the quality uniformity between the respective film rolls even when the film roll is fabricated again while performing slitting in order to divide the large-sized film roll which has been first wound into small rolls.

In a case in which the film roll is lengthened, it is still easy to maintain the quality although the film manufacturing process proceed under the conditions in which the film is more easily charged by contact with the transport roll, peeling off and the like since the polyester film has electric insulation properties.

MODE FOR CARRYING OUT THE INVENTION

Figure 1:
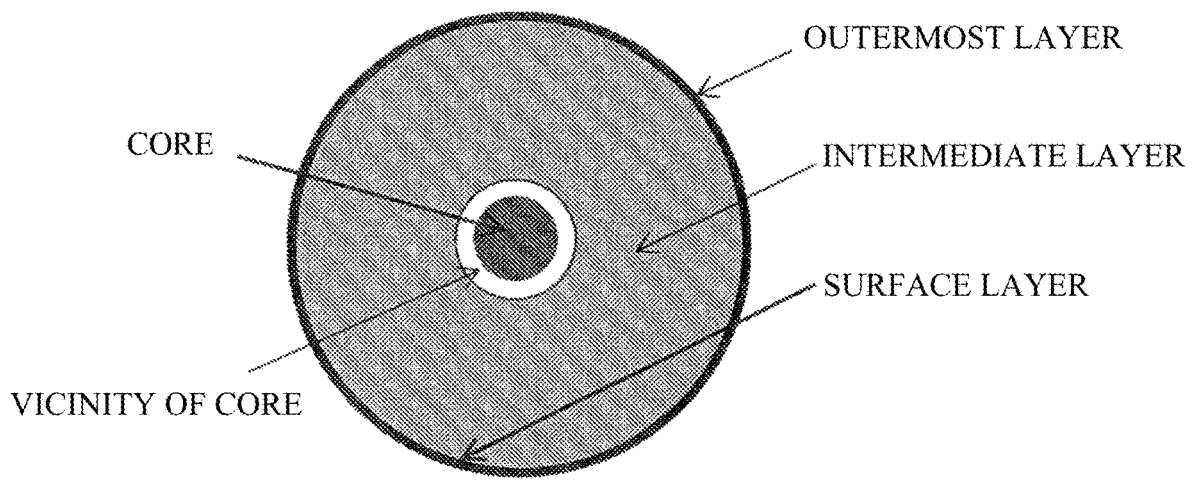
FIG. 1 is a diagram illustrating the relation of a surface layer, an intermediate layer, and a core layer with one another as seen from a film roll end face.
Figure 2:
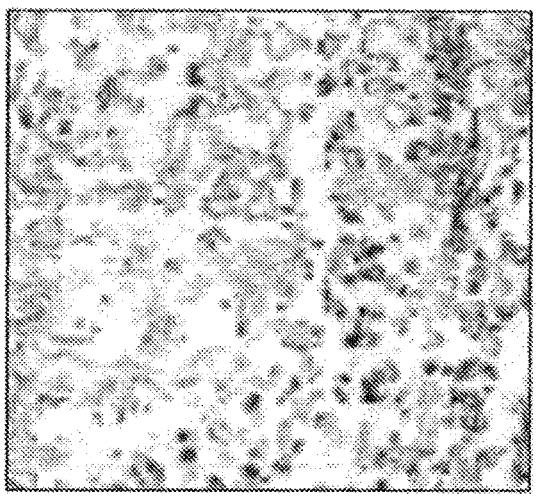
FIG. 2 is a photograph of a film surface in a state in which a strongly charged portion on a surface of a film unwound from a film roll is visualized by a charge distribution determining toner. Static marks are observed.
Figure 3:
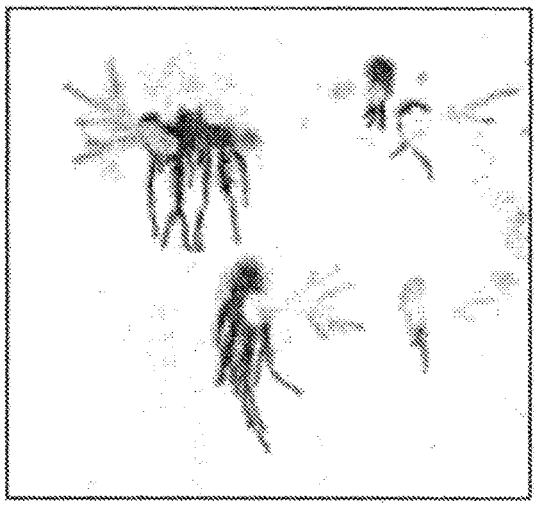
FIG. 3 is a photograph of a film surface in a state in which a portion having a discharge mark on a surface of a film unwound from a film roll is visualized by a charge distribution determining toner. Discharge marks are observed.
Figure 4:
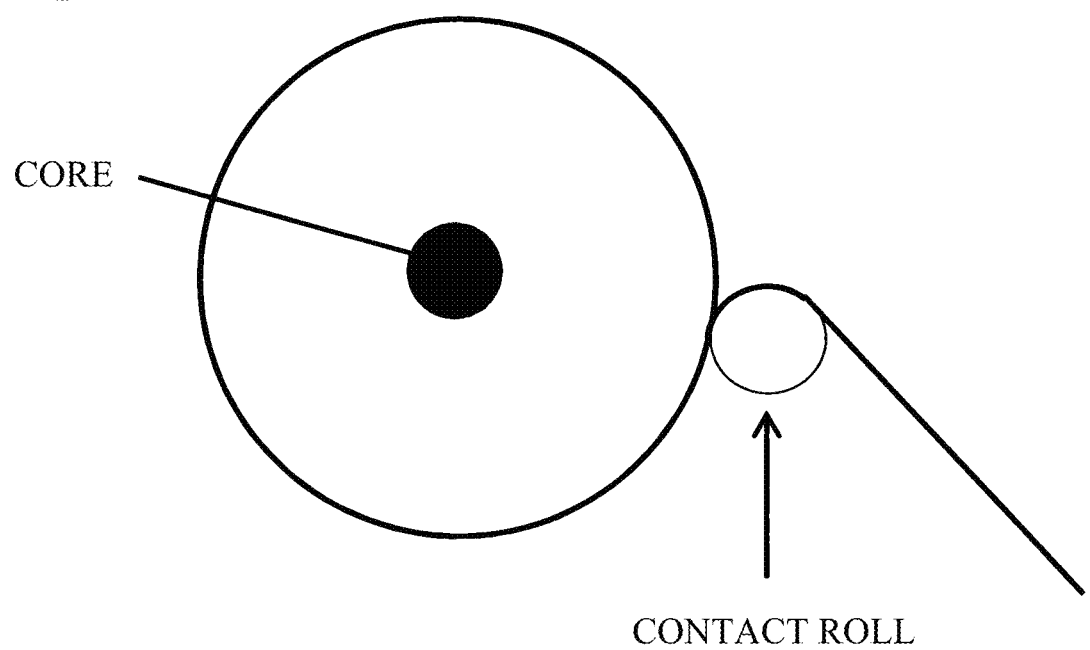
FIG. 4 is a diagram illustrating a film roll and a contact roll being wound.

Hereinafter, the present invention will be described in detail.

The biaxially oriented polyester film in the present invention is formed of a polyester resin composition containing the following polyester resin, preferably the following fine particles or/and the following additives.

The polyester resin constituting the biaxially oriented polyester film in the present invention is a polymer synthesized from a dicarboxylic acid or an ester-forming derivative thereof and a diol or an ester-forming derivative thereof. Examples thereof include polyethylene terephthalate, polybutylene terephthalate, and polyethylene-2,6-naphthalate, and polyethylene terephthalate is preferable from the viewpoint of mechanical characteristics, heat resistance, cost and the like.

Other components may be copolymerized with these polyesters as long as the object of the present invention is not impaired. Specifically, as the copolymerization components, examples of the dicarboxylic acid component include isophthalic acid, naphthalenedicarboxylic acid, 4,4-biphenyldicarboxylic acid, adipic acid, sebacic acid, and any ester-forming derivative thereof. Examples of the diol component include diethylene glycol, hexamethylene glycol, neopentyl glycol, and cyclohexanedimethanol. Examples of the diol component also include polyoxyalkylene glycols such as polyethylene glycol and polypropylene glycol. The amount of copolymerization is preferably 10 mol % or less, more preferably 5 mol % or less per constituent repeating unit.

Examples of a method for producing the polyester resin constituting the biaxially oriented polyester film in the present invention include a method in which an esterification or transesterification reaction is first conducted according to a conventional method using the above-mentioned dicarboxylic acid or an ester-forming derivative thereof and the above-mentioned diol or an ester-forming derivative thereof as main starting materials and then a polycondensation reaction is conducted at a high temperature and a reduced pressure.

The intrinsic viscosity of the polyester resin constituting the biaxially oriented polyester film in the present invention is preferably in a range of 0.50 to 0.9 dl/g, more preferably in a range of 0.55 to 0.8 dl/g from the viewpoint of film formability and recycling properties.

It is preferable to add fine particles as a lubricant to the biaxially oriented polyester film in the present invention in order to improve slipperiness at the time of film formation and secondary processing such as vapor-deposition.

The dynamic friction coefficient and the static friction coefficient can be used as an indicator of slipperiness.

Examples of the fine particles to be used include inorganic fine particles and organic fine particles. Examples of the inorganic fine particles include particles formed of silica, alumina, titanium dioxide, calcium carbonate, kaolin, and barium sulfate. Examples of the organic fine particles include acrylic resin particles, melamine resin particles, silicone resin particles, and fine particles formed of cross-linked polystyrene.

As the average particle size of the fine particles, it is preferable that the weight average particle size measured by a Coulter counter is in a range of 0.05 to 3.0 μm. The dynamic friction coefficient is likely to increase when the weight average particle size is 0.05 μm or more, and the dynamic friction coefficient is likely not to increase too high when the weight average particle size is 3.0 μm or less.

As the fine particles for adjusting the dynamic friction coefficient and static friction coefficient of the biaxially oriented polyester film in the present invention, inorganic fine particles formed of silica, calcium carbonate, or alumina or organic fine particles formed of polymethacrylate, polymethyl acrylate, or any derivative thereof are preferable, inorganic fine particles formed of silica or calcium carbonate are more preferable, inorganic fine particles formed of silica are particularly preferable among these from the viewpoint of decreasing haze of the biaxially oriented polyester film.

As a method for blending the fine particles into the biaxially oriented polyester film in the present invention, for example, the fine particles can be added at an arbitrary stage in the production of polyester-based resin, but it is preferable to add the fine particles as a slurry dispersed in ethylene glycol or the like at the stage of esterification or at the stage after the termination of transesterification reaction and before the start of polycondensation reaction and to conduct the polycondensation reaction. It is also preferable to blend the fine particles by a method in which a slurry of particles dispersed in ethylene glycol, water or the like is blended with a polyester-based resin raw material using a kneading extruder with a vent or a method in which the dried particles are blended with a polyester-based resin raw material using a kneading extruder.

The lower limit of the content of fine particles in the biaxially oriented polyester film in the present invention is preferably 100 ppm by weight, more preferably 900 ppm by weight, particularly preferably 1500 ppm by mass.

When the content of fine particles is 100 ppm by weight or more, it is easy to decrease the dynamic friction coefficient and static friction integer, the amount of air entrained does not increase when the master roll is slit and the film is wound around a core, and the film is less likely to loosen or wrinkle even after the air in the recesses between the films in the film roll after being wound and between the protrusions formed on the film surface is bled.

The upper limit of the content of fine particles is preferably 20000 ppm by weight, more preferably 2000 ppm by weight, particularly preferably 1800 ppm by weight. When the content of fine particles is 20000 ppm by weight or less, not only the transparency is less likely to decrease but also the dynamic friction coefficient of the film does not decrease too low, and end face deviation is less likely to occur.

The biaxially oriented polyester film in the present invention may contain a small amount of other polymers, antioxidants, heat stabilizers, anti-static agents, ultraviolet absorbers, plasticizers, pigments or other additives and the like as long as the object of the present invention is not impaired.

[Method for Manufacturing Biaxially Oriented Polyester Film]

Suitable examples of the biaxially oriented polyester film in the present invention will be described below, but the biaxially oriented polyester film is not limited to the following.

For example, the biaxially oriented polyester film can be obtained by melt-extruding a composition containing the polyester resin described above as a main component using an extruder to form an un-stretched film and manufacturing the un-stretched film by the method to be described below.

When the polyester resin composition is melt-extruded, it is preferable to dry the polyester resin composition using a dryer such as a hopper dryer or a paddle dryer or a vacuum dryer. After being dried in this manner, the polyester resin composition is melted at a temperature of 200° C. to 300° C. and extruded into a film shape using an extruder. Alternatively, the polyester resin, fine particles, and additives may be sent through separate extruders, merged, mixed and melted, and extruded into a sheet shape. When the molten resin composition is extruded, an arbitrary existing method such as a T-die method and a tubular method can be adopted.

Thereafter, an un-stretched sheet can be obtained by rapidly cooling the sheet-shaped molten polyester resin composition after extrusion. As a method for rapidly cooling the molten polyester resin composition, a method in which a substantially un-oriented resin composition sheet is obtained by casting the molten polyester resin composition onto a rotating drum through a mouthpiece and rapidly cooling and solidifying the molten polyester resin composition can be suitably adopted. The temperature of the rotating drum is preferably set to 30° C. or lower.

Furthermore, the obtained un-stretched sheet can be achieved by appropriately combining the following film forming conditions such as stretching conditions in the longitudinal direction and the transverse direction, thermosetting conditions, and heat relaxation conditions. This will be described in detail below. The longitudinal direction means the direction in which the un-stretched sheet is run, and the transverse direction means the direction perpendicular to the longitudinal direction.

The stretching method can be simultaneous biaxial stretching in which stretching in the longitudinal direction and stretching in the transverse direction are performed at the same time or sequential biaxial stretching in which stretching in either of the longitudinal direction or the transverse direction is first performed, but sequential biaxial stretching is most preferable from the viewpoint of high film forming speed and high productivity.

The stretching temperature in the longitudinal direction is preferably in a range of (Tg+15°) C. to (Tg+55°) C. from the viewpoint of keeping the variation in the winding hardness on the film surface in the transverse direction constant, and the stretching ratio is preferably in a range of 3.3 to 4.7 times.

It is preferable that the stretching temperature is (Tg+55°) C. or lower and the stretching ratio is 3.3 times or more since the molecular orientation in the longitudinal direction and the transverse direction is well-balanced and the difference between the physical properties in the longitudinal direction and the physical properties in the transverse direction is small. This is preferable since the flatness of the obtained biaxially oriented polyester film is also favorable.

On the other hand, it is preferable that the stretching temperature in the MD direction is (Tg+15°) C. or higher and the stretching ratio is 4.7 times or less since the shrinkage stress does not increase too much and bowing decreases.

In stretching in the longitudinal direction, the difference in physical properties in the film transverse direction can be further decreased in a method in which stretching is performed not in one step but in multiple steps between a plurality of rolls since stretching is gradually performed in the longitudinal direction while controlling the stretching speed. Two- to five-step stretching is preferable from the viewpoint of effect, equipment, and cost.

In the case of performing stretching in the transverse direction, the film is stretched in the transverse direction by guiding the un-stretched film to a tenter apparatus capable of holding both ends of the stretched film in the longitudinal direction with clips and heating the film, heating the film to a predetermined temperature with hot air, and then increasing the distance between the clips while transporting the film in the longitudinal direction.

It is preferable that the stretching temperature in the transverse direction is (Tg+5°) C. or higher since fracture is less likely to occur at the time of stretching. It is preferable that the stretching temperature is (Tg+40°) C. or lower since uniform stretching in the transverse direction is likely to be performed, thickness unevenness in the transverse direction is less likely to increase, and the variation in the winding hardness on the film roll surface in the transverse direction is less likely to increase. The stretching temperature is more preferably (Tg+8°) C. or higher and (Tg+37°) C. or lower, still more preferably (Tg+11°) C. or higher and (Tg+34°) C. or lower.

The stretching ratio in the transverse direction is preferably 2 times or more and 6 times or less. It is preferable that the stretching ratio is 2 times or more since it is easy to obtain a high yield in terms of mass balance, and the mechanical strength does not decrease as well as the thickness unevenness in the transverse direction is less likely to increase and the variation in the winding hardness of the film roll in the transverse direction is less likely to be caused. It is preferable that the stretching ratio is 6 times or less since fracture is less likely to occur at the time of stretching and film formation.

The thermo-setting temperature of the film stretched in the transverse direction is preferably 220° C. to 245° C. It is preferable that the thermo-setting temperature is 245° C. or lower since bowing is less likely to increase. On the other hand, it is preferable that the temperature is 220° C. or higher since the thermal shrinkage does not increase too high in both the longitudinal direction and the transverse direction and the thermal dimensional stability at the time of vapor-deposition processing is improved. It is preferable that the TD thermo-setting temperature is 245° C. or lower since bowing is less likely to increase.

In the heat relaxation treatment step, the film is in a situation to be significantly likely to fluctuate up and down since the binding force in the transverse direction may decrease and the film may loosen by its own weight until the film is shrunk by heat relaxation and the film may swell by the accompanying airflow of hot air blown from the nozzles installed above and below the film. Hence, in this heat relaxation treatment step, the amounts of changes in the orientation angle and the diagonal thermal shrinkage difference of the obtained biaxially oriented polyester film greatly fluctuate depending on the transport state of the film. Examples of a method for reducing these include keeping the film parallel by adjusting the wind speed of hot air blown from the upper and lower nozzles.

The relaxation rate in the transverse direction is preferably 4% to 8%. It is preferable that the heat relaxation rate is 4% or more since the thermal shrinkage in the transverse direction of the obtained biaxially oriented polyester film does not increase too high and the dimensional stability at the time of vapor-deposition processing is improved. On the other hand, it is preferable that the heat relaxation rate is 8% or less since the tensile stress (bowing phenomenon) applied in the direction opposite to the direction of travel toward the film in the transverse direction center of the film does not increase too high, the film thickness unevenness rate in the transverse direction does not increase, and thus the variation rate of the average winding hardness on the film roll surface in the transverse direction does not increase.

The thermo-setting step and the heat relaxation treatment step may be performed separately or at the same time.

The wide biaxially oriented polyester film which has been stretched and formed by the method described above is wound using a winder apparatus to fabricate a master roll. The width of the master roll is preferably 5000 mm or more and 10000 mm or less. It is preferable that the width of the roll is 5000 mm or more since the cost per film area decreases in the subsequent slitting step, vapor-deposition processing, and printing processing.

The winding length of the master roll is preferably 10000 m or more and 100000 mm or less. It is preferable that the winding length of the roll is 5000 mm or more since the cost per film area decreases in the subsequent slitting step, vapor-deposition processing, and printing processing.

The film thickness of the biaxially oriented polyester-based film roll of the master roll is preferably 5 to 40 μm. It is preferable that the film thickness is 5 μm or more since the strength and firmness as a film do not decrease and the film roll is less likely to wrinkle. On the other hand, there is no problem as a film roll even when the film thickness is thick, but it is preferable to decrease the film thickness from the viewpoint of cost. The film thickness is more preferably 8 to 30 μm, particularly preferably 9 μm to 20 μm.

The thickness unevenness rate of the biaxially oriented polyester-based film of the master roll in the transverse direction is preferably 10% or less. The thickness unevenness rate is measured using a continuous contact type thickness gauge as presented in Examples. The overall thickness nonuniformity in the transverse direction is calculated by the following Equation 1. It is preferable that the film thickness unevenness rate is 10% or less since the winding hardness in the transverse direction is likely to be constant. It is more preferable as the value of the thickness unevenness rate is smaller.

$$\text{Film thickness unevenness rate in transverse direction} = \{(\text{maximum thickness value} - \text{minimum thickness value}) \div \text{average thickness}\} \times 100(\%) \quad \text{Equation 1}$$

The static friction coefficient and dynamic friction coefficient between the film surfaces of the winding outer surface and winding inner surface of the biaxially oriented polyester film of the master roll are both preferably 0.20 or more and 0.60 or less, still more preferably 0.23 or more and 0.50 or less, most preferably 0.25 or more and 0.40 or less. It is preferable that the static friction coefficient and the dynamic friction coefficient are 0.20 or more since the film does not slip too much and winding deviation is less likely to occur. When the static friction coefficient and the dynamic friction coefficient are 0.60 or less, the amount of air entrained does not increase when the master roll is slit and the film is wound around a core and at the time of slitting, and the film is less likely to loosen or wrinkle even after the air in the recesses between the films in the film roll after being wound and between the protrusions formed on the film surface formed on the film surface is bled.

The arithmetic mean height on the winding inner surface of the biaxially oriented polyester fill of the master roll is preferably 0.010 to 0.050 µm. It is preferable that the arithmetic mean height on the winding inner surface of the film surface is 0.010 µm or more since the films in the film roll are less likely to adhere to each other (blocking phenomenon), abnormal noise (sound of the adhered film peeling off) is less likely to be generated at the time of unwinding from the master roll, and film fracture is also less likely to occur. It is preferable that the arithmetic mean height on the winding inner surface of the film surface is 0.050 µm or less since there are fewer surface protrusions which lead to omission and defects of the coating and vapor-deposited thin film after secondary processing on the surface of the biaxially oriented polyester film in the film roll which has been slit and wound around a core and the quality of the coating film is less likely to deteriorate. The arithmetic mean height on the winding outer surface of the film surface is also preferably in a similar range.

[Film Roll]

The above-described master roll is slit to a width to be described later while applying tension in the longitudinal direction of the film and further applying pressure by the contact roll from above the film roll in the slitting step to be described later, wound around a core, and shipped as a polyester fill roll suitable for a product.

The width of the polyester film roll of the present invention is preferably 400 mm or more and 3000 mm or less. It is preferable that the width of the film roll is 400 mm or more since the cost per film area does not increase in the subsequent vapor-deposition processing and printing processing. It is preferable that the width of the film roll is 3000 mm or less from the viewpoint of handleability in secondary processing. The width of the film roll is more preferably 500 mm or more and 2500 mm or less, particularly preferably 600 mm or more and 2300 mm or less.

The winding length of the master roll is preferably 10000 m or more and 100000 mm or less. It is preferable that the winding length of the roll is 5000 mm or more since the cost per film area decreases in the subsequent slitting step, vapor-deposition processing, and printing processing.

A biaxially oriented polyester film unwound from the obtained master roll is slit to the specified width and winding length using a slitter and wound around a core to obtain a polyester film roll. The core used for the biaxially oriented polyester film roll of the present invention is not particularly limited, and a tubular core which is formed of a plastic, a metal, or a paper tube and has a diameter of 3 inches (37.6 mm), 6 inches (152.2 mm), 8 inches (203.2 mm) or the like can be usually used.

The tension applied in the longitudinal direction of the film and the pressure (hereinafter referred to as surface pressure) applied by the contact roll from above the film roll in the slitting step are particularly important in control of the winding hardness on the film roll surface and in the film roll. Examples of specific suitable slitting conditions will be described in the order of progress of the slitting step.

[At Start of Winding]

(1) The winding tension (initial tension) applied to the film at the start of winding around a core is preferably 50 N/m or more and 110 N/m or less, more preferably 60 N/m or more and 80 N/m or less. It is preferable that the initial tension is 50 N/m or more since the winding hardness of the core increases and wrinkles are less likely to be generated when the film running speed is increased at the start of winding. It is preferable that the initial tension is 110 N/m or less since the hardness does not increase too high and the paper tube serving as the core of the film roll is less likely to be deformed.

(2) The surface pressure (initial surface pressure) of the contact roll at the start of winding is preferably 500 N/m or more and 800 N/m or less. It is preferable that the initial surface pressure is 500 N/m or more since there is an effect of holding down the film when the film running speed is increased at the start of winding and wrinkles are less likely to be generated. This is preferable since the winding does not become too soft and distortion of the film roll, loosening of the film, and wrinkling that occur as the air entrained in the film roll at the time of slitting is bled from between the films when the film roll is stored for a long time (for example, half a year) in, for example, a warehouse are less likely to occur. It is preferable that the initial surface pressure is 800 N/m or less since the hardness of the film roll does not increase too high and the paper tube serving as the core of the roll is less likely to be deformed. The initial surface pressure is more preferably 550 N/m or more and 750 N/m or less, particularly preferably 600 N/m or more and 700 N/m or less.

[From Start of Winding to Winding Diameter of 200 to 300 mm]

(1) The acceleration of the film running speed from the start of winding to a winding diameter of 200 to 300 mm is preferably 50 m/min$^2$ or more and 200 m/min$^2$ or less, more preferably 75 m/min$^2$ or more and 175 m/min$^2$ or less. It is preferable that the acceleration of the film running speed is 50 m/min$^2$ or more since wrinkles are less likely to be generated in the vicinity of the core (core layer) when the film running speed is increased. It is preferable that the acceleration is 200 m/min$^2$ or less since end face deviation is less likely to occur in the vicinity of the core (core layer) when the film running speed is increased. When wrinkling and end face deviation occur in the vicinity of the core (core layer), wrinkling and end face deviation continue to occur thereafter.

The winding diameter here means the tree distance (mm) obtained by subtracting the diameter of the core from the diameter of the wound film roll.

[From Winding Diameter of 200 to 300 mm to End of Winding]

(1) The film running speed from a winding diameter of 200 to 300 mm is preferably constant, and the film running speed is preferably 400 m/min or more and 800 m/min or less, more preferably 500 m/min or more and 700 m/min or less.

[From Start of Winding to End of Winding]

(1) The winding tension applied to the film from the start of winding to the end of winding is preferably constant or gradually increased and is preferably 50 N/m or more and 100 N/m or less, more preferably 60 N/m or more and 80 N/m or less.

(2) The surface pressure of the contact roll from the start of winding to the end of winding is preferably constant or gradually increased, and the surface pressure increase rate that indicates the proportion of the surface pressure (final surface pressure) of the contact roll at the end of winding to the surface pressure (initial surface pressure) of the contact roll at the start of winding is preferably 100% or more and 190% or less. The surface pressure increase rate is calculated by the following Equation 2.

Surface pressure increase rate=(surface pressure at end of winding÷initial surface pressure)×100  Equation 2

It is preferable that the surface pressure increase rate is 200% or less since the difference in change in the winding hardness when the surface pressure is changed from the initial surface pressure to the final surface pressure according to the progress of winding is small and the film roll end face is less likely to have wrinkles which are called spoking wrinkles and have shapes of flower patterns and spokes of wheels. The surface pressure increase rate is more preferably 110% or more and 180% or less, particularly preferably 120% or more and 170% or less.

It is speculated that as the surface pressure increase rate during winding increases, the difference in change in the winding hardness in the film roll radial direction increases, the stress applied in the roll radial direction at the time of film winding increases, and spoking wrinkles are generated by the elongation of the film in the vicinity of the film roll end face of that layer in the transverse direction. It is preferable that the variation rate of the winding hardness from the surface of the polyester film roll to the core is set to 3% or more and 10% or less.

[At End of Winding]

The surface pressure (final surface pressure) of the contact roll at the end of winding is preferably 700 N/m or more and 950 N/m or less. When the final surface pressure is 700 N/m or more, the winding is not too soft and end face deviation of the film roll surface layer is less likely to occur.

[Characteristics of Polyester Film Roll]
[Winding Length]

The winding length of the polyester film roll of the present invention is preferably 2000 m or more and 65000 m or less. Here, the winding length refers to the length of the film in the longitudinal direction from the portion at which the film is unwound from the film edge on the outermost surface of the film roll and removed by 5 m from the film edge to the portion at 100 m in the longitudinal direction from the film edge fixed to the core toward the outermost surface of the film roll. It is preferable that the winding length is 2000 m or more in terms of cost since the labor to frequently exchange the film roll in the printing step decreases. It is more preferable as the winding length is longer, but it is preferable that the winding length is 65000 m or less since the roll diameter does not increase too large, the roll weight does not increase too heavy, and the handleability does not decrease.

[Winding Width]

The winding width of the polyester film roll of the present invention is preferably 400 mm or more and 3000 mm or less. Here, the winding width refers to the shortest distance from one edge of the film roll surface to the other edge. It is preferable that the winding width is 400 mm or more in terms of cost since the labor to frequently exchange the film roll in the printing step decreases. It is more preferable as the winding width is wider, but it is preferable that the winding width is 3000 mm or less since the roll width does not increase too wide, the roll weight does not increase too heavy, and the handleability does not decrease. The winding width is more preferably 1000 mm or more and 3000 mm or less, still more preferably 1500 mm or more and 3000 mm or less.

[Average Winding Hardness]

It is preferable that the average winding hardness is in a range of 500 or more and 700 or less when the winding hardness on the surface of the polyester film roll of the present invention is measured at intervals of 200 mm in the film transverse direction.

The "surface of the film roll" refers to the surface of the film roll after the film is unwound from the film edge on the outermost surface of the film roll and the range from the film edge to 5 m is removed.

The measurement point on the surface of the film roll in the transverse direction is a position moved in the transverse direction by 5 cm from the film edge side on which the winding direction of the film from the core of the film roll toward the outermost surface is right rotation, and a position further moved by 200 mm from the position. At this time, the last position is excluded from the calculation in a case in which the last position is at less than 5 cm from the film edge.

The winding hardness is measured using a hardness tester Parotester 2 manufactured by Proceq of Switzerland. When the average winding hardness in the transverse direction is 500 or more, the winding of the film roll is less likely to collapse, or the end faces are less likely to deviate, and the end faces are easily aligned (so-called no winding deviation).

It is preferable that the average winding hardness in the transverse direction is 700 or less since locally strong charging called static marks and discharge marks due to electrostatic discharge and the like are less likely to be generated on the film surface in the film roll, unevenness and omission of the coating and vapor-deposited thin film are less likely to occur at the time of secondary processing such as coating and vapor-deposition, and the quality is less likely to deteriorate. The average winding hardness is more preferably 650 or more and 690 or less. The winding hardness in the present invention is measured using a hardness tester Parotester 2 manufactured by Proceq of Switzerland.

It is preferable that the variation rate of the winding hardness is preferably 1% or more and 5% or less when the winding hardness on the surface of the polyester film roll of the present invention is measured at intervals of 200 mm in the transverse direction of the film roll. The variation rate of the winding hardness is calculated by the following Equation 3.

$$\text{Variation rate of winding hardness of film roll in transverse direction} = (\text{maximum value of winding hardness} - \text{minimum value of winding hardness}) \div \text{average winding hardness} \times 100(\%) \qquad \text{Equation 3}$$

It is not preferable that the variation rate of the winding hardness exceeds 5% since the film roll is likely to cause winding deviation, partial loosening of the film roll is caused, deformation and wrinkling of the film due to the tension applied at the time of secondary processing such as coating and vapor-deposition are likely to occur, and stable coating and vapor-deposited thin film cannot be performed. The variation rate of the winding hardness is ideally 0%, but it is practically difficult to achieve a variation rate of 0%, and at most 1% is considered to be the lower limit.

It is preferable that the variation rate of the average winding hardness is preferably 3% or more and 10% or less when the winding hardness is measured by dividing the polyester film roll of the present invention into 10 parts in the longitudinal direction from the surface to the core. The variation rate of the average winding hardness is calculated by the following Equation 4.

$$\text{Variation in hardness (longitudinal direction)} = (\text{maximum value of average winding hardness} - \text{minimum value of average winding hardness}) \div \text{average winding hardness} \times 100(\%) \qquad \text{Equation 4}$$

Here, to divide the polyester film roll into 10 parts in the longitudinal direction from the surface to the core means to divide the polyester film roll into 10 parts from a portion at which the film is unwound from the film edge on the outermost surface of the film roll and the range from the film edge to 5 m is removed to a portion at 100 m in the longitudinal direction from the film edge fixed to the core toward the outermost surface of the film roll. The film is wound to each division position, and the winding hardness on the surface of the film roll is measured at intervals of 200 mm in the film transverse direction.

The measurement point on the surface of the film roll in the transverse direction is a position moved in the transverse direction by 5 cm from the film edge side on which the winding direction of the film from the core of the film roll toward the outermost surface is right rotation, and a position further moved by 200 mm from the position. At this time, the last position is excluded from the calculation in a case in which the last position is at less than 5 cm from the film edge.

It is not preferable that the variation rate of the average winding hardness exceeds 10% since the difference in the average winding hardness between the layers at different positions in the film roll increases, thus the stress applied in the roll radial direction at the time of film winding increases, spoking wrinkles are likely to be generated, or partial loosening of the film roll is caused, deformation and wrinkling of the film due to the tension applied at the time of secondary processing such as coating and vapor-deposition are likely to occur, and the quality of the coating film is likely to deteriorate. The variation rate of the winding hardness is ideally 0%, but it is practically difficult to achieve a variation rate of 0%, and at most 3% is considered to be the lower limit.

[Film Thickness]

The arithmetic mean height on the winding inner surface of the film of the polyester film roll of the present invention is preferably 0.010 to 0.050 μm. It is not preferable that the arithmetic mean height is less than 0.010 μm since adhesion (blocking phenomenon) between the films in the roll occurs and abnormal noise (sound of the adhered film peeling off) is generated when the polyester film roll is unwound for secondary processing or the film fractures. It is not preferable that the arithmetic mean height of the film exceeds 0.050 μm since the quality of the coating film formed by secondary processing such as coating and vapor-deposition is likely to deteriorate.

The film thickness of the polyester film roll of the present invention is preferably 5 to 40 μm. It is preferable that the film thickness is 5 μm or more since the strength poverty and firmness as a film are less likely to significantly decrease and the film in the film roll is less likely to wrinkle. On the other hand, there is no problem as a film roll even when the film thickness is thick, but it is preferable to decrease the film thickness from the viewpoint of cost. The film thickness is more preferably 8 to 30 μm, particularly preferably 9 μm to 20 μm.

[Thickness Unevenness Rate in Film Transverse Direction]

The thickness unevenness rate of the biaxially oriented polyester film in the transverse direction of the polyester film roll of the present invention is preferably 10% or less. The thickness unevenness rate is measured using a continuous contact type thickness gauge as presented in Examples. The thickness unevenness rate of the film in the transverse direction is calculated by the following Equation 1 by continuously measuring the thickness in the transverse direction at 5 m/sec using a continuous thickness measuring apparatus.

It is preferable that the thickness unevenness rate of the film in the transverse direction is 10% or less since wrinkles of the film are less likely to be generated. It is more preferable as the thickness unevenness rate of the film in the transverse direction is smaller.

$$\text{Thickness unevenness rate of film in transverse direction} = \{(\text{maximum thickness value} - \text{minimum thickness value}) \div \text{average thickness}\} \times 100 \,(\%)$$
Equation 1

[Arithmetic Mean Height]

The arithmetic mean height on the winding inner surface of the film of the polyester film roll of the present invention is preferably 0.010 to 0.050 μm. It is not preferable that the arithmetic mean height is less than 0.010 μm since adhesion (blocking phenomenon) between the films in the roll occurs and abnormal noise (sound of the adhered film peeling off) is generated when the polyester film roll is unwound for secondary processing or the film fractures. It is not preferable that the arithmetic mean height of the film exceeds 0.050 μm since the quality of the coating film formed by secondary processing such as coating and vapor-deposition is likely to deteriorate.

[Static Friction Coefficient and Dynamic Friction Coefficient]

The static friction coefficient and dynamic friction coefficient between the film surfaces of the winding outer surface and winding inner surface of the biaxially oriented polyester film of the polyester film roll of the present invention are both preferably 0.20 or more and 0.60 or less, still more preferably 0.23 or more and 0.50 or less, most preferably 0.25 or more and 0.40 or less. It is not preferable that the static friction coefficient and the dynamic friction coefficient are lower than 0.20 since the film slips too much and winding deviation occurs. When the static friction coefficient and the dynamic friction coefficient are greater than 0.60, the amount of air entrained at the time of slitting increases and loosening and wrinkling are likely to occur by air bleeding from the recesses at the time of film rolling.

[Winding Deviation of Film Roll]

The height of irregularities on the end face of the film roll is preferably 3 mm or less, more preferably 2 mm or less. When the height of irregularities is 3 mm or less, the film is less likely to wrinkle and the film is likely to run smoothly during secondary processing.

[Wrinkling of Film Roll]

It is preferable that the trace of wrinkles is not visible when A4-sized films are taken from two portions of the outermost layer of the film roll immediately after being manufactured and a portion at which the film roll is unwound and moved by 100 m in the film roll surface direction from the film end fixed to the core and observed under a fluorescent lamp.

[Spoking Wrinkle on Film Roll End Face]

It is preferable that the length of wrinkles having a flower pattern shape and a spoke shape of wheels on the film roll end face is measured and there are no wrinkles having a wrinkle length of 30 mm or more. In this case, unevenness and omission of the coating and vapor-deposited thin film are likely to decrease after secondary processing.

[Static Mark]

It is preferable that strong charging and discharge marks are not locally visible when the film roll is placed on the slitter, the film is unwound from the film edge on the outermost surface of the film roll, removed by 4 m from the film edge, and sampled 10 cm in the center in the transverse direction and in a length of 10 cm in the longitudinal direction, and the charged state on the film surface is visualized using a charging distribution determining toner manufactured by Kasuga Electric Works Ltd. In this case, unevenness and omission of the coating and vapor-deposited thin film are likely to decrease after secondary processing.

EXAMPLES

Hereinafter, the present invention will be described in more detail with reference to Examples, but the present invention is not limited to the aspects of these Examples at all and can be appropriately modified without departing from the spirit of the present invention.

The method for evaluating the polyester resin is as follows.

[Glass Transition Turning (Tg)]

Using a differential scanning calorimetry apparatus (Model DSC6220 manufactured by SII Nanotechnology Co., Ltd.), the sample was melted to 280° C. in a nitrogen atmosphere, held for 5 minutes, and then rapidly cooled with liquid nitrogen, and the glass transition temperature thereof was measured from room temperature at a rate of temperature rise of 20° C./min.

[Intrinsic Viscosity (IV)]

Polyester was dissolved by 0.2 g in 50 ml of a mixed solvent of phenol/1,1,2,2-tetrachloroethane (60/40 (weight ratio)) and the intrinsic viscosity thereof was measured at 30° C. using an Ostwald viscometer. The unit is dl/g.

The method for evaluating the polyester film roll is as follows.

[Thickness of Film]

The thickness of the film was measured using a dial gauge in conformity with JIS K7130-1999 method A.

[Thickness Unevenness Rate of Film]

The film roll was placed on the slitter. Thereafter, the film was unwound from the film edge on the outermost surface of the film roll, removed by 1 m from the film edge, and then sampled in the full width in the transverse direction and in a length of 40 mm in the longitudinal direction, and the thickness thereof in the transverse direction was continuously measured at 5 m/sec using a film tester continuous thickness measuring instrument manufactured by Fujiwork Co., Ltd. The thickness unevenness rate is calculated by the following Equation 1.

$$\text{Thickness unevenness rate of film in transverse direction} = \{(\text{maximum thickness value} - \text{minimum thickness value}) \div \text{average thickness}\} \times 100 \, (\%) \quad \text{Equation 1}$$

[Arithmetic Mean Height]

The film roll was placed on the slitter. Thereafter, the film was unwound from the film edge on the outermost surface of the film roll, removed by 2 m from the film edge, and then sampled 10 cm in the center in the transverse direction and in a length of 10 cm in the longitudinal direction, and White Laser Interferometer (NEW VIEW 8300) manufactured by Zygo Corporation was used.

A 20× lens was attached to the interferometer, scanning was performed, and the arithmetic mean height (μm) of the sample was measured. The measurement was performed in a range of 0.82 μm in the MD direction and 0.82 μm in the transverse direction of one surface, and the surface excluding foreign substances such as un-melted matter, dust and the like was targeted.

The average value measured at arbitrary 10 portions of the 10 cm×10 cm sample as the measurement portion was used as the measured value.

[Friction Coefficient]

The film roll was placed on the slitter. Thereafter, the film was unwound from the film edge on the outermost surface of the film roll, removed by 3 m from the film edge, and then sampled 10 cm in the center in the transverse direction and in a length of 10 cm in the longitudinal direction, and the static friction coefficient and dynamic friction coefficient in a case in which the winding inner surface and winding outer surface of the film are joined together were determined in an environment of 23° C. and 65% RH using a tensile tester (Tensilon RTG-1210 manufactured by A & D Company) in conformity with JIS K-7125. The weight of the thread (spindle) around which the upper film was wound was 1.5 kg, and the size of the bottom area of the thread was 39.7 mm². The tension speed at the time of friction measurement was 200 mm/min.

[Static Mark]

The film roll was placed on the slitter. Thereafter, the film was unwound from the film edge on the outermost surface of the film roll, removed by 4 m from the film edge, and then sampled 10 cm in the center in the transverse direction and in a length of 10 cm in the longitudinal direction, and the charged state of the film surface was visualized using a charging distribution determining toner manufactured by Kasuga Electric Works Ltd.

It was judged to have static marks (x) in a case in which strong charging and discharge marks were locally visible, and it was judged not to have static marks (○) in a case in which strong charging and discharge marks were not visible. After the measurement, the film roll was rewound to the intermediate layer using a slitter and the charging evaluation of the film roll was performed by the method described above. The film roll was further rewound to the core layer, and the charging evaluation of the film roll was repeatedly performed.

[Average Winding Hardness on Surface of Film Roll]

The hardness of the film roll was measured using a hardness tester Parotester 2 manufactured by Proceq of Switzerland. Specifically, the film roll of the present invention fabricated by winding using a slitter is evaluated by repeatedly unwinding the roll using a film unwinding machine and measuring the hardness.

For the roll hardness of the outermost layer, the film was removed by 5 m from the roll, then the hardness is measured at intervals of 200 mm in the roll transverse direction, and the average of winding hardness is determined.

The "surface of the film roll" refers to the surface of the film roll after the film is unwound from the film edge on the outermost surface of the film roll and the range from the film edge to 5 m is removed.

The measurement point on the surface of the film roll in the transverse direction is a position moved in the transverse direction by 5 cm from the film edge side on which the winding direction of the film from the core of the film roll toward the outermost surface is right rotation, and positions further moved by 200 mm from the position. At this time, the last position is excluded from the calculation in a case in which the last position is at less than 5 cm from the film edge.

[Variation Rate of Winding Hardness on Film Roll Surface in Transverse Direction]

The value calculated by the following Equation 3 using the value obtained in (1) was adopted.

$$\text{Variation rate of winding hardness on film roll surface in transverse direction} = (\text{maximum value of winding hardness} - \text{minimum value of winding hardness}) \div \text{average winding hardness} \times 100 (\%) \quad \text{Equation 3}$$

[Variation Rate of Average Winding Hardness of Film Roll in Longitudinal Direction]

The film roll was divided into 10 parts from a portion at which the film was unwound from the film edge on the outermost surface of the film roll and the range from the film edge to 5 m was removed to a portion at 100 m in the longitudinal direction from the film edge fixed to the core toward the outermost surface of the film roll, the film was wound to each division position, and the winding hardness on the surface of the film roll was measured at intervals of 200 mm in the film transverse direction in the same manner as in (1) above, and used in the following Equation 4 for calculation of the value.

$$\text{Variation rate of winding hardness of film roll in longitudinal direction} = (\text{maximum value of average winding hardness} - \text{minimum value of average winding hardness}) \div \text{average winding hardness} \times 100(\%) \quad \text{Equation 4}$$

[Winding Deviation of Film Roll]

The presence or absence of irregularities on the end face of the film roll and the height thereof were measured. It was judged not to have winding deviation (○) in a case in which there was no irregularity on the end face of the roll or in a case in which there were irregularities but the heights thereof are 3 mm or less, and it was judged to have winding deviation (x) in a case in which the heights of irregularities exceeded 3 mm.

[Wrinkling of Film Roll]

As the evaluation of wrinkles, it was judged to have wrinkles (x) in a case in which the trace of wrinkles was visible when A4-sized films were taken from two portions of the outermost layer of the film roll immediately after being manufactured and a portion at which the film roll was unwound and moved by 100 m in the film roll surface direction from the film end fixed to the core and observed under a fluorescent lamp, and it was judged not to have wrinkles (○) in a case in which the trace of wrinkles was not visible.

[Spoking Wrinkle on Film Roll End Face]

The lengths of spoking wrinkles (wrinkles having a flower pattern shape and a spoke shape of wheels) on the film roll end face were measured, and it was judged as NG (x) in a case in which the lengths of wrinkles were 30 mm or more and it was judged as OK (○) in a case in which there were no wrinkles or in a case in which the lengths of wrinkles were less than 30 mm.

Example 1

Polyethylene terephthalate (intrinsic viscosity=0.62 dl/g, Tg=78° C.) containing silica having an average particle size of 2.4 μm at 0.15% by weight was dried, then supplied into an extruder, melted at 285° C., discharged through a T-shaped mouthpiece, and cooled and solidified on a casting drum to obtain an un-stretched polyethylene terephthalate sheet. This sheet was heated to 115° C. and stretched in the longitudinal direction at a total stretching ratio of 4.5 times by three-stage stretching in which the sheet was stretched 1.24 times at the first stage, 1.4 times at the second stage, and 2.6 times at the third stage. Subsequently, the sheet was stretched in the transverse direction at a temperature of 140° C. and a stretching ratio of 4.3 times, thermo-set at 245° C., and heat-relaxed by 5% in the transverse direction. Next, both edges of the film after being stretched were cut and removed, and then the film was subjected to a corona discharge treatment and wound into a roll using a winder to fabricate a master roll (winding length: 68000 m, width: 8000 mm) of a biaxially oriented polyester film having a thickness of 12 μm.

The biaxially oriented polyester film was unwound from the obtained master roll, and the film roll was wound around a core having a diameter of 6 inches (152.2 mm) while performing slitting at a width of 2200 mm and apply surface pressure to the film roll using a contact roll and tension to the film using a 2-axis turret winder.

The conditions at this time are presented in Table 1. The physical properties and evaluation results of the obtained film roll are presented in Table 2.

Example 2

A film roll was obtained in the same as in Example 1 except that the winding tension while performing slitting was set to 105 N/m and the initial surface pressure and final surface pressure of the contact roll surface pressure were changed to 700 N/m and 700 N/m, respectively. The slitting conditions are presented in Table 1, and the physical properties and evaluation results of the obtained film and master roll are presented in Table 2.

Example 3

A film roll was obtained in the same as in Example 1 except that the initial surface pressure of the contact roll surface pressure was changed to 700 N/m. The slitting conditions are presented in Table 1, and the physical properties and evaluation results of the obtained film roll are presented in Table 2.

Example 4

A film roll was obtained in the same as in Example 1 except that the film acceleration while performing slitting was set to 100 m/min$^2$ and the initial surface pressure of the contact roll surface pressure was changed to 700 N/m. The slitting conditions are presented in Table 1, and the physical properties and evaluation results of the obtained film roll are presented in Table 2.

Example 5

A film roll was obtained in the same as in Example 1 except that the film acceleration while performing slitting was set to 100 m/min$^2$, the winding tension (intermediate and final) while performing slitting was set to 75 N/m, and the initial surface pressure of the contact roll surface pressure was changed to 700 N/m. The slitting conditions are presented in Table 1, and the physical properties and evaluation results of the obtained film roll are presented in Table 2.

Comparative Example 1

A film roll was obtained in the same as in Example 1 except that the initial surface pressure of the contact roll surface pressure was changed to 450 N/m. The slitting conditions are presented in Table 1, and the physical properties and evaluation results of the obtained film roll are presented in Table 2.

Comparative Example 2

A film roll was obtained in the same as in Example 1 except that the initial surface pressure and final surface pressure of the contact roll surface pressure were changed to 300 N/m and 650 N/m, respectively. The slitting conditions are presented in Table 1, and the physical properties and evaluation results of the obtained film roll are presented in Table 2.

Comparative Example 3

A film roll was obtained in the same as in Example 1 except that the initial surface pressure of the contact roll surface pressure was changed to 500 N/m. The slitting conditions are presented in Table 1, and the physical properties and evaluation results of the obtained film roll are presented in Table 2.

Comparative Example 4

A film roll was obtained in the same as in Example 1 except that the winding tension applied to the film during winding was changed to 62 N/m and the winding tension finally applied was changed to 59 N/m. The slitting conditions are presented in Table 1, and the physical properties and evaluation results of the obtained film roll are presented in Table 2.

Comparative Example 5

A film roll was obtained in the same as in Example 1 except that the film acceleration while performing slitting was changed to 250 m/min$^2$. The slitting conditions are presented in Table 1, and the physical properties and evaluation results of the obtained film roll are presented in Table 2.

Comparative Example 6

A film roll was obtained in the same as in Example 1 except that the film acceleration while performing slitting was set to 50 m/min$^2$, the winding tension while performing slitting was set to 55 N/m, and the initial surface pressure and final surface pressure of the contact roll surface pressure were changed to 350 N/m and 450 N/m, respectively. The slitting conditions are presented in Table 1, and the physical properties and evaluation results of the obtained film roll are presented in Table 2.

Comparative Example 7

A film roll was obtained in the same as in Example 1 except that the film acceleration while performing slitting was set to 50 m/min$^2$, the winding tension while performing slitting was set to 85 N/m, and the initial surface pressure and the final surface pressure of the contact roll surface pressure were changed to 900 N/m and 1100 N/m, respectively. The slitting conditions are presented in Table 1, and the physical properties and evaluation results of the obtained film roll are presented in Table 2.

As a result of the evaluation, the average hardness of the film rolls, the variation in hardness, and the arithmetic mean height of the films and master rolls of Examples 1 to 5 were within the specified ranges, thus wrinkles on the surface layer on the roll immediately after being wound using a slitter and the core, winding deviation, and spoking wrinkles on the end face were not generated, static marks and discharge marks were not generated, and the film rolls were excellent in vapor-deposition processability.

In Comparative Example 1, the average value of and variation in hardness on the outermost layer of the film roll were in the specified ranges, but the variation in hardness when being measured at 10 positions divided from the outermost layer to the core was out of the specified range, and the surface pressure increase rate was high, thus spoking wrinkles were generated since the difference in hardness when the surface pressure was changed from the initial surface pressure to the final surface pressure according to the progress of winding is too large, and the film roll was inferior in secondary processability.

In Comparative Example 2, the average value of and variation in hardness on the outermost layer of the film roll were in the specified ranges, but the variation in hardness when being measured at 10 positions divided from the outermost layer to the core was out of the specified range, and the surface pressure increase rate was high, thus spoking wrinkles were generated since the difference in hardness when the surface pressure was changed from the initial surface pressure to the final surface pressure according to the progress of winding was too large, winding deviation occurred since the initial surface pressure of the contact roll surface pressure was low, and the film roll was inferior in secondary processability.

In Comparative Example 3, winding deviation and wrinkles were generated since the final surface pressure was too low, and the film roll was inferior in secondary processability.

In Comparative Example 4, the winding tension finally applied was low, the difference in hardness when the surface pressure was changed to the final surface pressure was too large, thus spoking wrinkles were generated, and the film roll was inferior in secondary processability.

In Comparative Example 5, the variation in hardness on the outermost layer of the film roll was great since the acceleration when the film winding speed was increased at the start of winding was high, winding deviation occurred since the film roll was likely to loosen, and the film roll was inferior in secondary processability.

The film of Comparative Example 6 was a film roll inferior in secondary processability since the average value of the hardness of the film roll was low and thus winding deviation occurred.

In Comparative Example 7, the average value of hardness of the film roll was high, thus static marks and discharge marks were generated, and the film roll was inferior in secondary processability.

INDUSTRIAL APPLICABILITY

The biaxially oriented polyester film roll of the present invention relates to one that has less wrinkles and film surface defects, exhibits no deviation of winding, and is suitable for secondary processing such as coating and vapor-deposition. The biaxially oriented polyester film roll can be suitably used as a film for food packaging since the quality of the coating film after secondary processing is also excellent. The biaxially oriented polyester film roll is particularly useful for widened and lengthened film rolls with improved productivity.

TABLE 1

Film winding conditions

| | Master roll film thickness μm | Film speed acceleration (0 to 250 m) m/min² | Film speed (more than 250 m) m/min | Winding tension Initial N/m | Winding tension Middle (21000 m) N/m | Winding tension Final N/m | Increase rate % | Contact roll surface pressure Initial surface pressure N/m | Contact roll surface pressure Final surface pressure N/m | Surface pressure increase rate % | Film roll winding length m | Film roll width mm |
|---|---|---|---|---|---|---|---|---|---|---|---|---|
| Example 1 | 12 | 150 | 500 | 65 | 65 | 65 | 100 | 550 | 900 | 164 | 62000 | 2200 |
| Example 2 | 12 | 150 | 500 | 105 | 105 | 105 | 100 | 700 | 700 | 100 | 62000 | 2200 |
| Example 3 | 12 | 150 | 500 | 65 | 65 | 65 | 100 | 700 | 900 | 129 | 62000 | 2200 |
| Example 4 | 12 | 100 | 500 | 65 | 65 | 65 | 100 | 700 | 900 | 129 | 62000 | 2200 |
| Example 5 | 12 | 100 | 500 | 65 | 75 | 75 | 115 | 700 | 900 | 129 | 62000 | 2200 |
| Comparative Example 1 | 12 | 150 | 500 | 65 | 65 | 65 | 100 | 450 | 900 | 200 | 62000 | 2200 |
| Comparative Example 2 | 12 | 150 | 500 | 65 | 65 | 65 | 100 | 300 | 650 | 217 | 62000 | 2200 |
| Comparative Example 3 | 12 | 150 | 500 | 65 | 65 | 65 | 100 | 550 | 500 | 91 | 62000 | 2200 |
| Comparative Example 4 | 12 | 150 | 500 | 65 | 62 | 59 | 90 | 550 | 900 | 164 | 62000 | 2200 |
| Comparative Example 5 | 12 | 250 | 500 | 65 | 65 | 65 | 100 | 550 | 900 | 164 | 62000 | 2200 |
| Comparative Example 6 | 12 | 50 | 500 | 55 | 55 | 55 | 100 | 350 | 450 | 129 | 62000 | 2200 |
| Comparative Example 7 | 12 | 50 | 500 | 85 | 85 | 85 | 100 | 900 | 1100 | 122 | 62000 | 2200 |

TABLE 2

Film roll evaluation

| | Film thickness unevenness rate % | Arithmetic mean height Winding inner μm | Static friction coefficient Winding inner (−) | Static friction coefficient Winding outer (−) | Average winding hardness on film roll surface | Winding hardness on film roll surface in transverse direction Maximum | Winding hardness on film roll surface in transverse direction Minimum | Winding hardness on film roll surface in transverse direction Variation rate % | Average winding hardness from film roll Surface layer |
|---|---|---|---|---|---|---|---|---|---|
| Example 1 | 9.4 | 0.025 | 0.31 | 0.31 | 651 | 664 | 637 | 4.1 | 651 |
| Example 2 | 8.4 | 0.027 | 0.31 | 0.33 | 655 | 667 | 643 | 3.7 | 655 |
| Example 3 | 7.9 | 0.031 | 0.30 | 0.34 | 658 | 667 | 654 | 2.0 | 658 |
| Example 4 | 7.7 | 0.030 | 0.29 | 0.32 | 675 | 688 | 675 | 2.0 | 675 |
| Example 5 | 8.1 | 0.026 | 0.30 | 0.32 | 684 | 692 | 684 | 1.2 | 684 |
| Comparative Example 1 | 9.8 | 0.032 | 0.29 | 0.33 | 632 | 645 | 620 | 4.0 | 632 |
| Comparative Example 2 | 8.2 | 0.028 | 0.30 | 0.33 | 541 | 547 | 520 | 5.0 | 541 |
| Comparative Example 3 | 9.3 | 0.029 | 0.30 | 0.32 | 523 | 534 | 507 | 5.2 | 523 |
| Comparative Example 4 | 9.0 | 0.028 | 0.31 | 0.32 | 625 | 636 | 607 | 4.6 | 625 |
| Comparative Example 5 | 9.9 | 0.030 | 0.30 | 0.33 | 644 | 659 | 624 | 5.6 | 644 |
| Comparative Example 6 | 8.5 | 0.032 | 0.31 | 0.32 | 483 | 496 | 479 | 3.5 | 483 |
| Comparative Example 7 | 8.0 | 0.028 | 0.28 | 0.31 | 729 | 739 | 729 | 1.4 | 729 |

Film roll evaluation

| | Average winding hardness from film roll surface to core Middle | Average winding hardness from film roll surface to core Core | Variation rate % | Roll end face winding deviation | Surface layer wrinkle | Roll end face spoking wrinkle | Static mark Outermost layer | Static mark Core |
|---|---|---|---|---|---|---|---|---|
| Example 1 | 651 | 702 | 9.6 | ○ | ○ | ○ | ○ | ○ |
| Example 2 | 653 | 694 | 8.8 | ○ | ○ | ○ | ○ | ○ |
| Example 3 | 649 | 685 | 5.3 | ○ | ○ | ○ | ○ | ○ |
| Example 4 | 650 | 689 | 5.9 | ○ | ○ | ○ | ○ | ○ |

TABLE 2-continued

|  | | | | | | | | |
|---|---|---|---|---|---|---|---|---|
| Example 5 | 658 | 679 | 3.8 | ○ | ○ | ○ | ○ | ○ |
| Comparative Example 1 | 625 | 675 | 10.3 | ○ | ○ | x | ○ | ○ |
| Comparative Example 2 | 534 | 658 | 12.6 | x | ○ | x | ○ | ○ |
| Comparative Example 3 | 512 | 641 | 7.8 | x | x | ○ | ○ | ○ |
| Comparative Example 4 | 618 | 668 | 10.5 | ○ | ○ | x | ○ | ○ |
| Comparative Example 5 | 640 | 681 | 9.8 | x | ○ | ○ | ○ | ○ |
| Comparative Example 6 | 467 | 632 | 7.6 | x | ○ | ○ | ○ | ○ |
| Comparative Example 7 | 701 | 739 | 4.0 | ○ | x | ○ | x | x |

The invention claimed is:

1. A polyester film roll obtained by winding a biaxially oriented polyester film around a core, wherein
the biaxially oriented polyester film consists of polyethylene terephthalate and particles formed of silica,
the content of the silica in the biaxially oriented polyester film is 100 ppm by weight or more and 20,000 ppm by weight or less,
the weight average particle size of the silica measured by a Coulter counter is 0.05 µm to 3.0 µm,
the biaxially oriented polyester film has a thickness of 5 µm or more and 40 µm or less,
an average winding hardness on a surface of the polyester film roll is in a range of 500 or more and 700 or less,
a variation rate of a winding hardness on a surface of the polyester film roll in a film transverse direction is 1% or more and 5% or less,
a variation rate of an average winding hardness from a surface of the polyester film roll to the core is 3% or more and 10% or less,
static friction coefficient on each of a winding outer surface and a winding inner surface of the biaxially oriented polyester film is 0.2 or more and 0.60 or less, and
arithmetic mean height on a winding inner surface of the biaxially oriented polyester film is 0.010 µm or more and 0.050 µm or less.

2. The polyester film roll according to claim 1, wherein a thickness unevenness rate of the biaxially oriented polyester film in a transverse direction is 10% or less.

3. The polyester film roll according to claim 2, wherein dynamic friction coefficients on a winding outer surface and a winding inner surface of the biaxially oriented polyester film are both 0.2 or more and 0.60 or less.

4. The polyester film roll according to claim 3, wherein a winding length of the biaxially oriented polyester film is 2000 m or more and 65000 m or less.

5. The polyester film roll according to claim 4, wherein a width of the polyester film roll is 400 mm or more and 3000 mm or less.

6. The polyester film roll according to claim 5, wherein the biaxially oriented polyester film is for a vapor-deposited film base material.

7. The polyester film roll according to claim 1, wherein a winding length of the biaxially oriented polyester film is 2000 m or more and 65000 m or less.

8. The polyester film roll according to claim 1, wherein a width of the polyester film roll is 400 mm or more and 3000 mm or less.

9. The polyester film roll according to claim 1, wherein the biaxially oriented polyester film is for a vapor-deposited film base material.

* * * * *